(12) United States Patent
Kume et al.

(10) Patent No.: US 6,980,303 B2
(45) Date of Patent: Dec. 27, 2005

(54) LIGHT-EMITTING/RECEIVING COMBINED UNIT AND DISPLACEMENT SENSORS USING THE SAME

(75) Inventors: Hidehiro Kume, Tokyo (JP); Akihito Nakayama, Tokyo (JP); Kayoko Taniguchi, Kanagawa (JP); Akihiro Kuroda, Kanagawa (JP)

(73) Assignees: Sony Corporation, (JP); Sony Precision Technology Inc., (JP)

( * ) Notice: Subject to any disclaimer, the term of this patent is extended or adjusted under 35 U.S.C. 154(b) by 344 days.

(21) Appl. No.: 10/240,417

(22) PCT Filed: Feb. 1, 2002

(86) PCT No.: PCT/JP02/00841

§ 371 (c)(1),
(2), (4) Date: May 8, 2003

(87) PCT Pub. No.: WO02/063246

PCT Pub. Date: Aug. 15, 2002

(65) Prior Publication Data

US 2003/0169434 A1 Sep. 11, 2003

(30) Foreign Application Priority Data

Feb. 2, 2001 (JP) .............................. 2001-026743

(51) Int. Cl.[7] .............................................. G01B 11/14
(52) U.S. Cl. ..................................... 356/614; 356/616
(58) Field of Search ............................. 356/614–623; 250/237 G

(56) References Cited

U.S. PATENT DOCUMENTS 5,051,579 A 9/1991 Tsukiji et al. ............... 250/231
5,247,493 A * 9/1993 Kime et al. ............... 369/13.17

(Continued)

FOREIGN PATENT DOCUMENTS

JP 63-247616 10/1988

(Continued)

OTHER PUBLICATIONS

International Search Report.

Primary Examiner—Hoa Q. Pham
(74) Attorney, Agent, or Firm—Rader, Fishman & Grauer, PLLC; Ronald P. Kananen

(57) ABSTRACT

The present invention provides a light emitting/receiving composite unit (1) for emitting and receiving lights, which includes a light source (3), an optical splitting unit (4) for splitting returning lights to the composite unit (1) into a plurality of lights, a polarizing unit (5) for increasing and decreasing quantity of lights transmitted therefrom corresponding to polarization state of the returning lights, and an optical receiving unit (6) which has a plurality of photodetecting elements (6_1 to 6_4) for detecting the lights transmitted through the polarizing unit (5), which are unitedly integrated into one unit. Also, the present invention provides a displacement detection apparatus of grating interference type, which includes thus unitedly integrated composite unit (1), and an external optical system of an objective unit having a reflection type diffraction grating RG, a reflecting unit (R1a, R1b) for reflecting lights from the composite unit (1) to the reflection type diffraction grating RG, a polarizing unit (WP1a, WP1b) for changing polarization state of diffracted lights from the reflection type diffraction grating RG, and a reflecting unit (R2a, R2b) for reflecting lights transmitted through the polarizing unit (WP1a, WP1b) to cause the reflected lights go backward.

8 Claims, 4 Drawing Sheets

U.S. PATENT DOCUMENTS

| | | | |
|---|---|---|---|
| 5,523,844 A * | 6/1996 | Hasegawa et al. | 356/623 |
| 6,807,671 B2 * | 10/2004 | Horimai | 720/674 |
| 2003/0202189 A1 * | 10/2003 | Tamiya et al. | 356/494 |
| 2003/0123044 A1 * | 7/2003 | Oka | 356/3.02 |

FOREIGN PATENT DOCUMENTS

| | | |
|---|---|---|
| JP | 63-277926 | 11/1988 |
| JP | 5-215574 | 8/1993 |

* cited by examiner

LIGHT-EMITTING/RECEIVING COMBINED UNIT AND DISPLACEMENT SENSORS USING THE SAME

TECHNICAL FIELD

The present invention relates to an optical unit having a semiconductor laser as a light source for obtaining signals using polarization, and furthermore, to what is called a displacement detection apparatus or apparatus for detecting displacement of grating interference type using interference of diffracted lights.

BACKGROUND ART

Conventionally, among displacement detection apparatuses used in the field of manufacturing semiconductors, etc., there is known what is called a linear encoder which has a solid scale having a graduation marked thereon and a detection unit for electrically detecting displacement of the solid scale along the linear movement direction thereof. Among such linear encoders, as a displacement detection apparatus with high accuracy and high resolution, there is known a hologram encoder, etc. for detecting displacement using interference of diffracted lights.

FIG. 1 shows the configuration of a conventional displacement detection apparatus 101. The displacement detection apparatus 101 detects displacement using interference of diffracted lights generated by a diffraction grating.

The displacement detection apparatus 101 generally includes a light emitting unit 102, an optical path control and objective unit 103, and an optical receiving unit 104, each of which has following parts and components.

The light emitting unit 102 has a semiconductor laser (LS), a converging lens (L1), and a polarization beam splitter (BS1).

The optical path control and objective unit 103 has reflecting mirrors (R1a, R1b), a reflection type diffraction grating (RG), converging lenses (L2a, L2b), λ/4 wave plates (WP1a, WP1b), and reflecting mirrors (R2a, R2b).

The optical receiving unit 104 has a semitransparent mirror (HM), polarization beam splitters (BS2, BS3), a λ/4 wave plate (WP2), and photodetectors (PD1 to PD4).

A light emitted from the semiconductor laser LS being a light source arranged in the light emitting unit 102 is converged by the converging lens L1, and thus converged light is polarized and split into a light LFa and a light LFb by the polarization beam splitter BS1. The light LFa has its optical path deflected by the reflecting mirror R1a, and thus deflected light LFa goes to the reflection type diffraction grating RG. On the other hand, the light LFb has its optical path deflected by the reflecting mirror R1b, and thus deflected light LFb goes to the reflection type diffraction grating RG. When the converged light from the converging lens L1 is polarized and split into the light LFa and the light LFb, the converged light is split into the P polarization component and the S polarization component.

Diffracted lights from the reflection type diffraction grating RG arranged in the objective unit (such as a linear scale) whose order of diffraction are of the same sign (of the same positive sign or of the same negative sign) and are higher than at least the first order are transmitted or pass through the converging lenses L2a, L2b to be converged, respectively. Then, thus converged lights have their polarization direction rotated by a right angle by the λ/4 wave plates WP1a, WP1b, respectively, which are arranged corresponding to the diffraction angle. Then, the lights passing through the λ/4 wave plates WP1a, WP1b are reflected by the reflecting mirrors R2a, R2b, respectively. Then, the reflected lights go backward along thus followed optical path to the polarization beam splitter BS1.

Since each of the lights coming to the polarization beam splitter BS1 has its polarization direction rotated by a right angle against the original direction thereof, the lights which pass through the polarization beam splitter BS1 are oriented along a direction toward the semitransparent mirror HM, which is different from that toward the semiconductor laser LS. Then, the lights which pass through the semitransparent mirror HM are split into two, one of which goes to the polarization beam splitter BS3, while the other of which goes to the polarization beam splitter BS2 after passing through the λ/4 wave plate WP2, respectively.

The polarization beam splitter BS3 is so arranged as to be rotated around the optical path being its rotation center by 45 degrees against the polarization direction of the coming light.

The light which comes to the polarization beam splitter BS2 is polarized and split into two which go to the photodetectors PD1, PD2, respectively, where intensity of the lights are converted into electrical signals. On the other hand, the light which comes to the polarization beam splitter BS3 is polarized and split into two which go to the photodetectors PD3, PD4, respectively, where the intensity of the lights are converted into electrical signals.

Next, the basic principle of the displacement detection apparatus 101 will be explained.

The light LFa and the light LFb of different polarization direction or of different polarization state which are split by the polarization beam splitter BS1 become the diffracted lights of the same sign when diffracted by the reflection type diffraction grating RG. Then, the diffracted lights have their polarization direction rotated by substantially a right angle when passing through the λ/4 wave plates WP1a, WP1b, respectively. Then, the resulting lights are reflected by the reflecting mirrors R2a, R2b, respectively, and are returned to the polarization beam splitter BS1 to be combined.

When the light LFa and the light LFb are combined, since they are split from the light emitted from the semiconductor laser LS and have the same polarization component, there is generated interference even though the polarization direction thereof are different from each other.

When the reflection type diffraction grating RG is caused to move in a direction such as an arrow A along which the grating is aligned relatively with other optical systems, the light LFa and the light LFb which are combined by the polarization beam splitter BS1 interfere with each other. Thus, intensity variation is generated in a pitch corresponding to the diffraction order for each polarization direction, the photodetectors PD1 to PD4 can detect the intensity variation as light intensity distributions whose phases are different from each other by separating the intensity variation attributable to the interference into a plurality of polarization components. That is, the movement or displacement of the reflection type diffraction grating RG can be detected by detecting the light intensity distributions with resolution of a pitch of the diffraction grating multiplied by one half of the reciprocal of the diffraction order and the reciprocal of the diffraction frequency. Also, the shape of the intensity variation obtained by the photodetectors PD1 to PD4 is extremely similar to that of a sinusoidal wave, higher resolution can be obtained by dividing a detected wave form in the interpolation manner.

In such a displacement detection apparatus using interference of diffracted lights, it becomes possible to realize resolution of the order of nm (nanometer) by using a reflection type diffraction grating made out of a hologram and dividing a sinusoidal wave generated therefrom.

However, in the manufacturing process of the conventional displacement detection apparatus, when assembling parts or units such as a light emitting unit, an optical receiving unit, and other optical parts, each of which is independently made from others, it is necessary to adjust those units or parts in respective manufacturing steps. So, there are raised following problems.

That is, firstly, in assembling parts of the apparatus, since accurate adjustment is required to remove or offset inequality of accuracy or characteristics of respective finished parts, complicated manufacturing steps have to be inevitably prepared. So, it is difficult to reduce the manufacturing cost, and to reduce assembling machines in size since wide working space is required for adjusting, clamping, and fixing respective parts. Secondly, since adhesive is required when fixing respective parts after accurate adjustment, and the state of adhesion is prone to be affected by environmental variation etc., assembling shear attributable to such environmental variation and variation per hour may be undesirably raised.

DISCLOSURE OF THE INVENTION

Accordingly, the present invention has an object to overcome the above-mentioned drawbacks of the prior art by providing a new light emitting/receiving composite unit or composite unit for emitting and receiving lights, and a new displacement detection apparatus using this unit.

The present invention has another object to provide a light emitting/receiving composite unit of high reliability which is low in price and can be reduced in size and weight, and a displacement detection apparatus using this unit.

The above object can be attained by providing a light emitting/receiving composite unit, comprising:

a light source for emitting a light;

an optical splitting unit for splitting returning lights into a plurality of lights, the light from the light source going to and returning from an external optical system to be the returning lights;

a polarizing unit for increasing and decreasing quantity of lights transmitted therefrom corresponding to polarization state of the returning lights; and an optical receiving unit which has a plurality of photo-detecting elements for detecting the lights transmitted through the polarizing unit;

wherein the light source, the optical splitting unit, the polarizing unit, and the optical receiving unit are unitedly packaged to be integrated into one unit.

Also, the above object can be attained by providing a displacement detection apparatus, comprising:

thus unitedly integrated light emitting/receiving composite unit;

an objective unit having a diffraction grating;

a polarizing unit for changing polarization state of diffracted lights from the diffraction grating, the lights from the light emitting/receiving composite unit being diffracted by the diffraction grating to be the diffracted lights; and a reflecting unit for reflecting lights transmitted through the polarizing unit to cause the reflected lights go backward to the light emitting/receiving composite unit;

in which the objective unit, the polarizing unit, and the reflecting unit form the external optical system.

According to the light emitting/receiving composite unit and the displacement detection apparatus of present invention, since the light source, the optical splitting unit for splitting the returning lights to the composite unit, the polarizing unit, and the optical receiving unit are unitedly packaged to be integrated into one unit, positions of respective parts can be adjusted easily, which enables high reliability as well as lowered price, reduced size and weight.

These objects and other objects, features and advantages of the present invention will become more apparent from the following detailed description of the preferred embodiments of the present invention.

BEST MODE FOR CARRYING OUT THE INVENTION

The light emitting/receiving composite unit, and the displacement detection apparatus using this unit according to the present invention will further be described below concerning the best modes with reference to the accompanying drawings.

Figure 2:
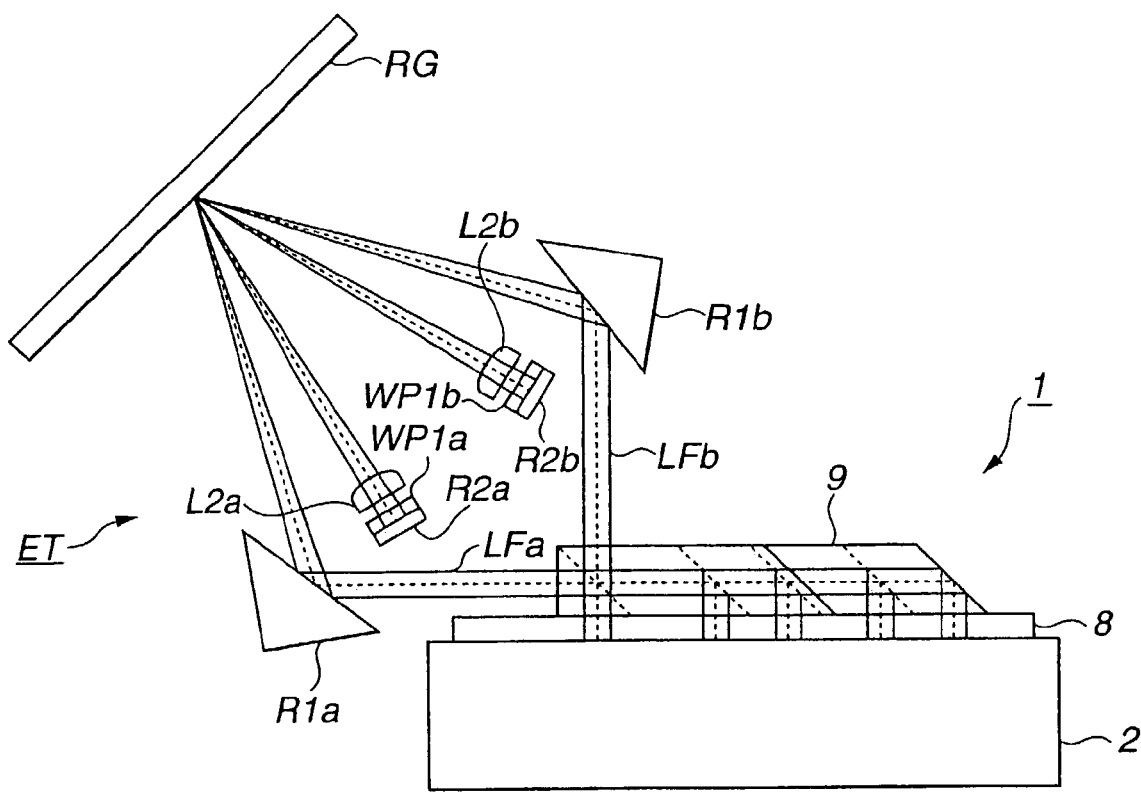
FIG. 2 shows the configuration of a displacement detection apparatus using a light emitting/receiving composite unit according to the present invention.

FIG. 2 shows the configuration of a displacement detection apparatus using a light emitting/receiving composite unit (or a unit for transmitting and receiving lights) according to the present invention, which are employed in a displacement detection apparatus of grating interference type.

Figure 1:
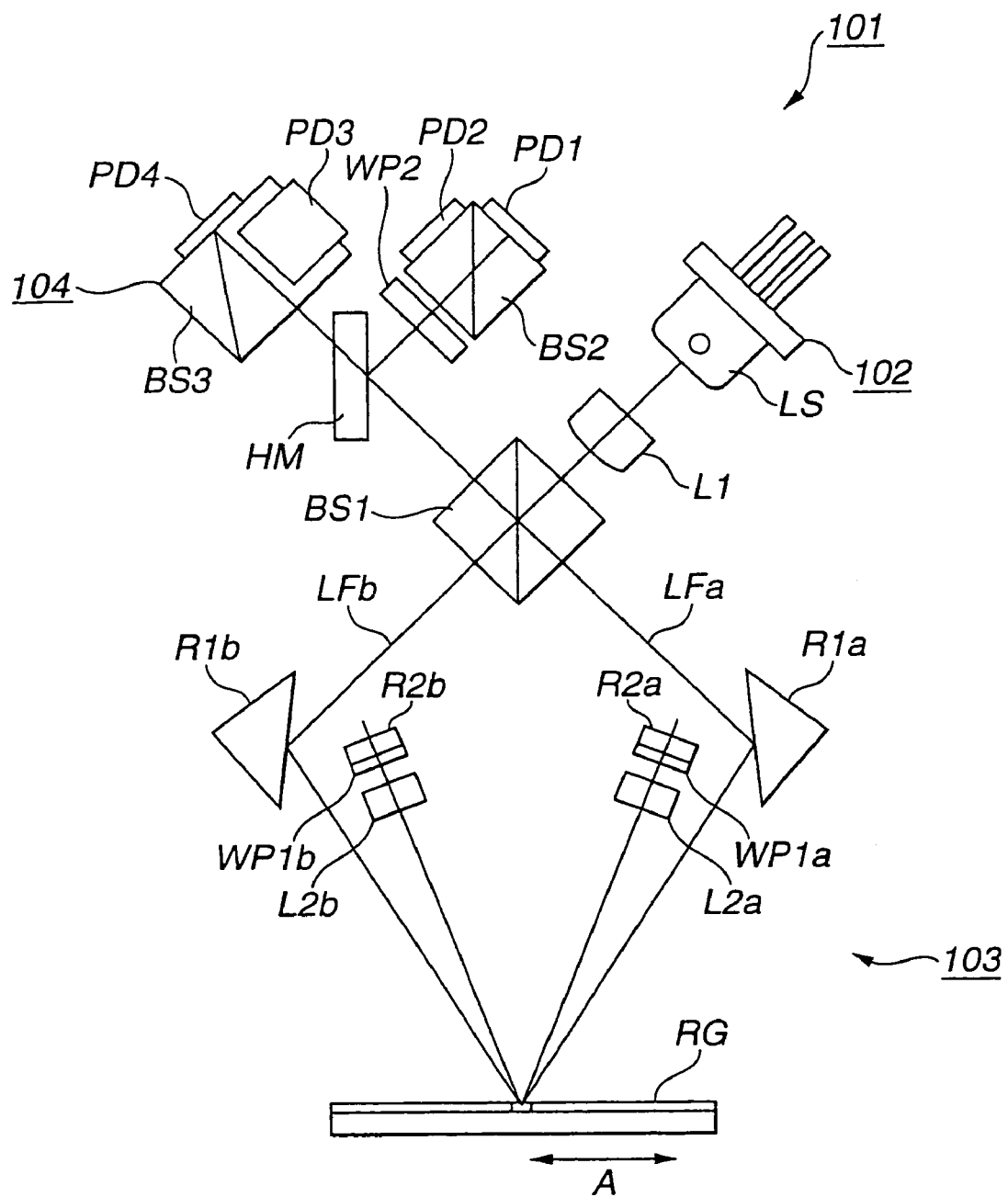
FIG. 1 shows the configuration of a conventional displacement detection apparatus.

As can be seen when comparing the configuration of the displacement detection apparatus shown in FIG. 2 with that shown in FIG. 1, most of optical parts or components are housed in a light emitting/receiving composite unit 1, and two lights of a light LFa and a light LFb, which are polarized and split, are caused to go externally from the light emitting/receiving composite unit 1 to first reflecting elements (reflecting mirrors R1a, R1b) arranged in an external optical system ET, respectively, where the two lights have their optical paths deflected. The first reflecting elements reflect the lights from the light emitting/receiving composite unit 1 toward a reflection type diffraction grating RG such as a hologram grating (volume type phase hologram, etc.) of high diffraction efficiency.

The respective lights from the light emitting/receiving composite unit 1 go to the reflection type diffraction grating RG, arranged in an objective unit such as a linear scale, after traveling a short distance. This is to reduce the difference between optical path lengths of the lights in the displacement detection apparatus so as to prevent emergence of wave length error in original signals. Then, the lights are diffracted by the diffraction order higher than the first order, and pass through converging lenses L2a, L2b to be converged, respectively. Then, thus converged lights go to polarizing parts or polarizing elements and second reflecting elements, where λ/4 wave plates WP1a, WP1b are used as the polarizing elements and reflecting mirrors R2a, R2b are used as the second reflecting elements, respectively. That is, the light LFa which is diffracted by the reflection type diffraction grating RG go to the reflecting mirror R2a via the λ/4 wave plate WP1a, while the light LFb which is diffracted by the reflection type diffraction grating RG go to the reflecting mirror R2b via the λ/4 wave plate WP1b. These λ/4 wave plates WP1a, WP1b change polarization state of the diffracted lights from the reflection type diffraction grating RG. That is, as described above, the diffracted lights have their polarization direction rotated by a right angle by the λ/4 wave plates WP1a, WP1b, respectively. The reflecting mirrors R2a, R2b reflect lights passing through the λ/4 wave plates WP1a, WP1b, respectively. And, the reflected lights go backward along thus followed optical path to the light emitting/receiving composite unit 1. That is, the lights reflected by the reflecting mirrors R2a, R2b become returning lights to the light emitting/receiving composite unit 1.

Figure 3:
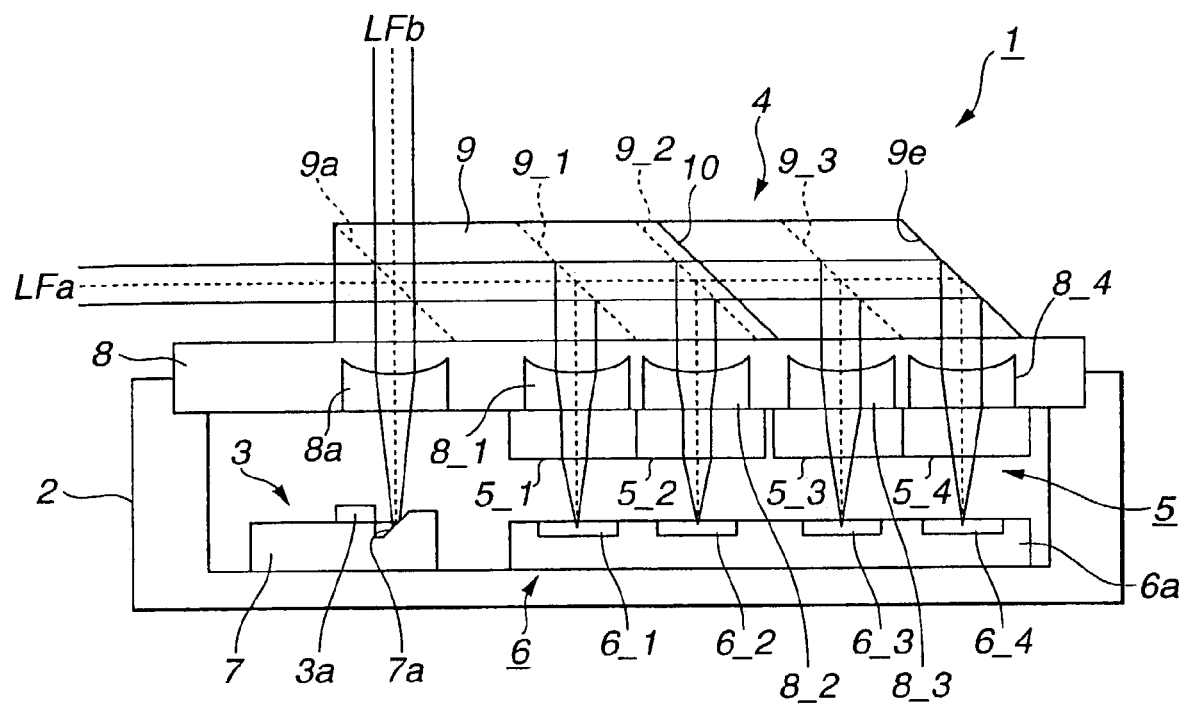
FIG. 3 shows the configuration of the light emitting/receiving composite unit according to the present invention.
Figure 4:
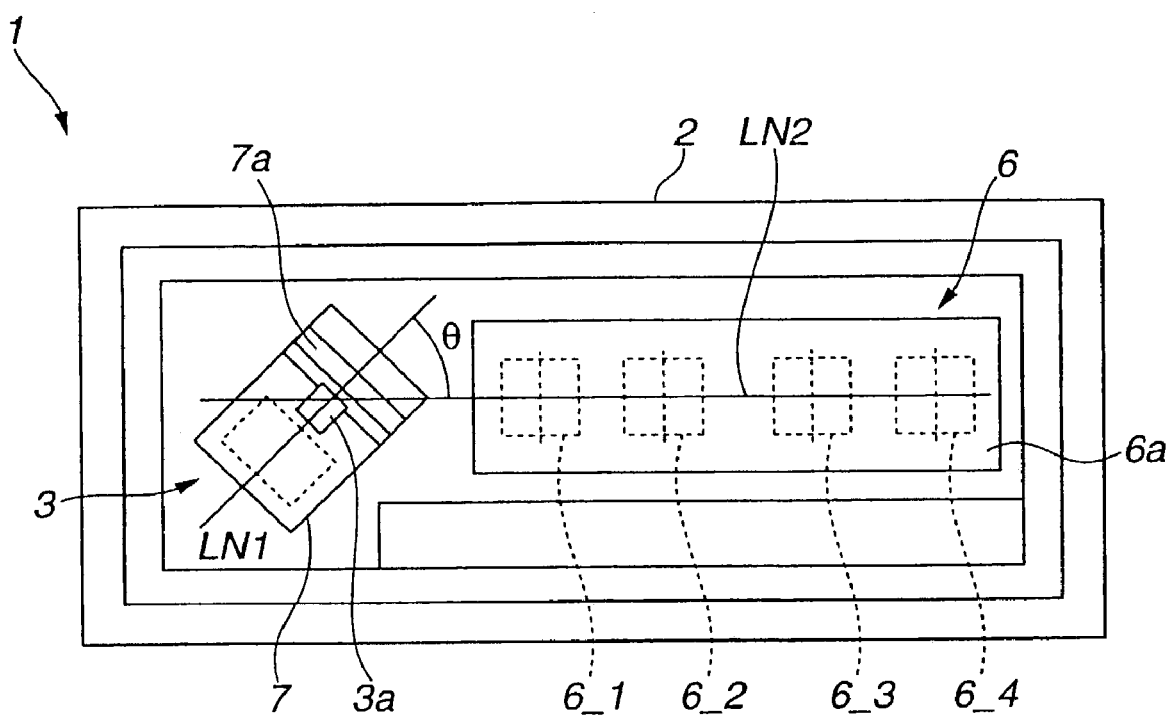
FIG. 4 shows a plan view for explaining arrangement of a light source and an optical receiving unit of the light emitting/receiving composite unit.

FIG. 3 and FIG. 4 show the configuration of the light emitting/receiving composite unit 1. FIG. 3 shows the main internal configuration, while FIG. 4 shows a plan view as seen from the direction of the optical axes of a light source and an optical receiving unit.

The light emitting/receiving composite unit 1 includes a light source 3, an optical splitting unit 4, a polarizing unit 5, and an optical receiving unit 6, and these components are housed in a housing 2.

The light source 3 arranged in the light emitting/receiving composite unit 1 is used as a light source for measurement or a light emitting unit in the displacement detection apparatus, and a light emitting element is fixed onto a semiconductor base plate 7 which has a reflecting face 7a formed on a portion thereof for reflecting a light emitted from the light emitting element. In the following description, a semiconductor laser 3a is employed as the light emitting element. As shown in FIG. 3, the reflecting face 7a works as an optical path deflecting surface which deflects a light emitted from the semiconductor laser 3a along the upward direction in FIG. 3, which is the direction along a set up optical axis of the light source 3. So, a light from the semiconductor laser 3a is caused to go upward by the reflecting face 7a.

The housing 2 has the optical receiving unit 6 housed therein, and a plurality of photo-detecting parts or photo-detecting elements 6_1 to 6_4 for detecting lights passing through the polarizing unit 5 are arranged on a semiconductor base plate 6a. The semiconductor laser 3a and the semiconductor base plates 6a, 7 are electrically connected to an electrode for wiring, which is connected to the outside of the housing 2, by wire bonding or other means, which is not shown.

The housing 2 which has the semiconductor base plates 6a, 7 fixed therein has a cover 8 for covering and sealing the housing 2. Thus, the light source 3, the optical receiving unit 6, etc. are packaged. The cover 8 is made of transparent plastic, and a plurality of lenses 8a, 8_1 to 8_4 are formed therein. That is, the lens 8a is a converging lens formed on the optical axis of the light source 3, which causes a light emitted from the light source 3 to go out from the light emitting/receiving composite unit 1 (via a polarizing and splitting film to be described later). Also, the lenses 8_1 to 8_4 converge or diverge lights returned from the external optical system ET shown in FIG. 2. The lenses 8_1 to 8_4 correspond to the photo-detecting elements 6_1 to 6_4 in this order, and each of the lenses 8_1 to 8_4 is formed above its corresponding photo-detecting element.

The internal or bottom surface of the of cover 8, which faces the optical receiving unit 6, has polarizing elements 5_1 to 5_4 arranged thereunder, forming the polarizing unit 5. The number of the polarizing elements 5_1 to 5_4 is equal to that of the lenses 8_1 to 8_4 and to that of the photo-detecting elements 6_1 to 6_4, and the polarizing elements 5_1 to 5_4 are arranged correspond to the lenses 8_1 to 8_4 and the photo-detecting elements 6_1 to 6_4 in this order. That is, one optical receiving system is composed of a lens 8_X, a polarizing element 5_X, and a photo-detecting element 6_X, where the X is an integer of 1 to 4. Polarization characteristics or polarization directions (or polarizing angles) of the respective polarizing elements 5_1 to 5_4 are set to be different from each other so as to separate polarization component of the returning lights which are split by the optical splitting unit 4.

The cover 8 has a compound prism 9 arranged and fixed on the top surface thereof, which has a polarizing and splitting film 9a, optical splitting films 9_1, 9_2, 9_3 for splitting the returning lights, and a total reflecting surface 9e, configuring the optical splitting unit 4. The polarizing and splitting film 9a corresponds to the lens 8a, and is arranged on the optical axis of the light source 3. Also, the optical splitting films 9_1, 9_2, 9_3 correspond to the lenses 8_1, 8_2, 8_3, and are arranged on the optical axes of the photo-detecting elements 6_1, 6_2, 6_3, respectively. The total reflecting surface 9e corresponds to the lens 8_4, and is arranged on the optical axis of the photo-detecting element 6_4.

As has been described above, the light emitting/receiving composite unit 1 has the lens 8a, the lenses 8_1 to 8_4, and the polarizing unit 5 between the optical splitting unit 4 and the optical receiving unit 6.

Also, the compound prism 9 has a λ/4 wave plate 10 (corresponding to above-described λ/4 wave plate WP2) arranged behind the optical splitting film 9_2 (on the total reflecting surface 9e side), and the returning lights which pass through the λ/4 wave plate 10 go to the optical splitting film 9_3 and the total reflecting surface 9e.

In this embodiment, the returning lights which comes from the external optical system ET to the light emitting/receiving composite unit 1 is split into four lights by the optical splitting unit 4. On the other hand, the number of split lights is not restricted to four, and the returning lights can be split so long as the number of the split lights is two or more. Also, the polarizing elements 5_1 to 5_4 can be arranged at arbitrary positions, so long as the positions are between the optical splitting films 9_1, 9_2, 9_3, the total reflecting surface 9e and the photo-detecting elements 6_1 to 6_4.

Next, respective positions of the semiconductor base plate 7 which is provided with the reflecting face 7a and has the semiconductor laser 3a fixed thereon, and the semiconductor base plate 6a arranged in the optical receiving unit 6 will be explained with reference to FIG. 4, in which the cover 8 and the compound prism 9 are taken away for the convenience of explanation.

When viewing the light emitting/receiving composite unit 1 from the direction of the optical axes of the light source 3 and the optical receiving unit 6, a straight line "LN1" shows a line including the direction of light emission (the emission axis) of the semiconductor laser 3a as the light emitting element. The direction of the optical axis of the light source 3 is perpendicular to the paper surface depicting FIG. 4. Also, a straight line "LN2" shows a line connecting the respective centers of the photo-detecting elements 6_1 to 6_4 (shown by squares drawn in dotted lines in FIG. 4) arranged on the semiconductor base plate 6a, that is a line connecting the respective intersection points of the optical axes of the respective photo-detecting elements being the light receiving centers and the light receiving surface, which extends along the longitudinal direction of the semiconductor base plate 6a.

Angle "θ" shows an angle formed by the straight line LN1 and the straight line LN2, which is 45 degrees (or approximately 45 degrees).

Hereinafter, the operation of the displacement detection apparatus will be explained.

A light emitted from the semiconductor laser 3a arranged in the light source 3 go to the reflecting face 7a of the semiconductor base plate 7 along the straight line LN1, where the light has its optical path deflected. Then, the reflected light is converged by the converging lens 8a arranged in the cover 8, and thus converged light goes to the polarizing and splitting film 9a of the compound prism 9.

Then, the light is polarized and split into a light LFa and a light LFb, and the lights LFa, LFb are diffracted by the reflection type diffraction grating RG of the external optical system ET shown in FIG. 2 after having their optical paths deflected by the reflecting mirrors R1a, R1b, respectively. Then, the lights LFa, LFb have their polarization directions rotated by substantially a right angle by the λ/4 wave plates WP1a, WP1b after passing through the converging lenses L2a, L2b, becoming the returning lights after being reflected by the reflecting mirrors R2a, R2b, respectively, as has been described hereinbefore. Then, the returning lights go to the compound prism 9, and is returned to the polarizing and splitting film 9a. The lights LFa, LFb go to the compound prism 9 from the left side and from the upper side in FIG. 3, respectively.

Since each of the lights coming to the compound prism 9 has its polarization direction rotated by a right angle against the original direction thereof, the lights which pass through the polarizing and splitting film 9a are combined to be oriented toward the optical splitting films 9_1, 9_2, 9_3 and to the total reflecting surface 9e. Since the reflectance of the optical splitting films 9_1, 9_2, 9_3 are set to be ¼, ⅓, ½, in advance, respectively, the lights which go to the photo-detecting elements 6_1 to 6_4 after being split or being totally reflected are caused to be of approximately the same value. The λ/4 wave plate 10 of the compound prism 9 can further add phase information by changing a linearly polarized light to a circularly polarized light.

The lights which are split by the optical splitting films 9_1 to 9_3 and the total reflecting surface 9e go to the converging lenses 8_1 to 8_4 to be converged. Then, thus converged lights are polarized to be of polarization component different from each other, and go to the corresponding photo-detecting elements 6_1 to 6_4.

In this embodiment, since the number of thus split lights is four, for example, polarization directions of the polarizing elements 5_1 to 5_4 are set to be 0 degree, 45 degrees, 90 degrees, 135 degrees, respectively (angular interval of 45 degrees).

The lights which go to the photo-detecting elements 6_1 to 6_4 internally contain the movement or displacement information of the reflection type diffraction grating RG as variation of received light value induced from interference of diffracted lights of high order. Thus, displacement of the reflection type diffraction grating RG can be obtained by operating electrical signals converted from intensity of the lights detected by the respective photo-detecting elements 6_1 to 6_4.

Generally, structurally, the semiconductor laser 3a arranged in the light source 3 emits a linearly polarized light in parallel with the fixing surface of the semiconductor base plate 7 on which the semiconductor laser 3a is fixed. Thus, in case the semiconductor laser 3a and the polarizing and splitting film 9a of the compound prism 9 are positioned such that the emission axis of the semiconductor laser 3a and the line connecting the respective centers of the photo-detecting elements 6_1 to 6_4 of the optical receiving unit 6 are parallel with each other, that is, in case the straight line LN1 and the straight line LN2 shown in FIG. 4 are parallel with each other, the polarizing and splitting film 9a may not be able to split the returning lights into lights each of appropriate quantity.

Thus, to avoid this inconvenience, the semiconductor base plate 7 having the semiconductor laser 3a fixed thereon is positioned as shown in FIG. 4, in which the semiconductor base plate 7 is positioned in the housing 2 with its longitudinal direction rotated by 45 degrees against that of the compound prism 9.

With such configuration, the light which is emitted from the semiconductor laser 3a and deflected by the reflecting face 7a (deflected upward along the optical axis of the light source 3) go to the polarizing and splitting film 9a with a polarizing angle of 45 degrees which corresponds to the fixing angle of the semiconductor base plate 7 against the housing 2, and is split into a light of the P polarization component and a light of the S polarization component which are equal in quantity with each other. Thus, the light is prevented from being split unequally by the polarizing and splitting film 9a.

Furthermore, amplifying circuits (such as current voltage conversion amplifying circuits) for amplifying detected signals, operating circuits for operating detected signals, etc., other than light receiving circuits, may be unitedly formed on the semiconductor base plate 6a on which the photo-detecting elements 6_1 to 6_4 are arranged. With such integrated configuration, detection accuracy can be improved since the S/N ratio is increased, and the displacement detection apparatus itself can be reduced in size and the manufacturing cost can be reduced.

As in the above, the present invention has been described by employing one embodiment, in which the semiconductor base plates 6a, 7 are arranged in and fixed to the internal surface of the housing 2. On the other hand, the present invention is not restricted to such configuration so long as similar function and effect can be obtained based on the purpose of the present invention. Also, the converging lenses 8a, 8_1 to 8_4 which are unitedly formed in the cover 8 can be replaced with other optical parts or components having similar function and effect, and other various embodiments can be possible.

The light emitting/receiving composite unit 1 and the displacement detection apparatus using this unit can solve the problems of the conventional displacement detection apparatus. In the conventional displacement detection apparatus, as shown in FIG. 1, independent optical units or parts are arranged on an optical path between the semiconductor laser LS and the polarization beam splitter BS1, and that between the polarization beam splitter BS1 and the photo-detectors PD1 to PD4. Thus, the respective optical parts are required to be fixed on a basal stand such as an optical base. So, positioning of the respective optical parts is troublesome. On the other hand, such inconvenience cannot be seen in the present invention.

According to the present invention, in case the optical parts (optical elements etc.) are unitedly packaged to be integrated into a semiconductor sealed structure, the polarizing elements for separating polarization component of the returning lights can be arranged on the optical paths, and the light emitting element (light source) and the photo-detecting elements (optical receiving unit) can be arranged in a plane. Also, the light emitting/receiving composite unit 1 can be manufactured easily by fixing respective optical parts after moving the unitedly arranged optical parts or adjusting positions and angles of the respective optical parts. Also, by employing conventional techniques, semiconductor elements can be accurately arranged and fixed easily on a silicon wafer or a coupled semiconductor sealed structure having a positioning reference, and the respective optical parts can be finely positioned and fixed easily by supplying power to the electronic components (light emitting element, photo-detecting elements, etc.) for operation after fixing and then arranging the respective optical parts at predetermined positions to detect the state and quantity of the lights going from the light emitting element to the photo-detecting elements. For example, such adjustment and fixing processing are realized in optical systems in head apparatuses for optical discs or other such systems. Thus, adjustment and assembling processes can be performed at a semiconductor manufacturing plant.

Thus, since the respective optical parts are unitedly integrated into the semiconductor sealed structure, adjustment can be performed easily, which enables high reliability in semiconductor manufacturing as well as lowered price, reduced size and weight.

Furthermore, polarization component of the returning lights can be separated easily by the polarizing elements arranged in the polarizing unit whose polarization directions are set to be different from each other. So, it is not necessary to take inconvenience of unbalance of separation ratio raised at the polarizing and splitting film into consideration.

INDUSTRIAL APPLICABILITY

As in the above, according to the present invention, since the light source, the optical splitting unit for splitting the returning lights to the composite unit, the polarizing unit, and the optical receiving unit are unitedly packaged to be integrated into one unit, positions of respective units or parts can be adjusted easily and accurately, and reduction in size becomes possible as the space for arranging the respective parts does not have to be large. Also, since the respective parts are unitedly integrated into one housing, the composite unit are scarcely affected by environmental variation and variation per hour. Thus, assembling shear can be prevented, and the reliability of the composite unit can be highly improved.

Furthermore, according to the present invention, since a lens unit for causing the light emitted from the light source to go out from the composite unit and for converging or diverging the returning lights is unitedly packaged to be integrated into the same unit, the integration ratio and reliability can be improved.

Furthermore, according to the present invention, since the polarizing unit is arranged between the optical splitting unit and the optical receiving unit, the composite unit can be reduced in size, and polarization component of the returning lights can be separated easily.

Furthermore, according to the present invention, a plurality of optical receiving systems can be formed by causing each of the polarizing elements arranged in the polarizing unit to correspond each of the photo-detecting elements arranged in the optical receiving unit. Also, the polarizing unit and the optical receiving unit can be arranged in a plane.

Furthermore, according to the present invention, the light emitted from the light source can be split into the light of the P polarization component and the light of the S polarization component which are equal in quantity with each other.

What is claimed is:
1. A light emitting/receiving composite unit, comprising:
a light source for emitting a light;
an optical splitting unit for splitting returning lights into a plurality of lights, the light from the light source going to and returning from an external optical system to be the returning lights;
a polarizing unit for increasing and decreasing quantity of lights transmitted therefrom corresponding to polarization state of the returning lights; and
an optical receiving unit which has a plurality of photo-detecting elements for detecting the lights transmitted through the polarizing unit;
wherein the light source, the optical splitting unit, the polarizing unit, and the optical receiving unit are unitedly integrated into one unit,
wherein the light source has a light emitting element, and an optical path deflecting means for deflecting the light emitted from the light emitting element along a set up optical axis of the light source, and
when viewing from the direction of the optical axes of the light source and the optical receiving unit, a straight line including the light emission direction of the light emitting element and a straight line connecting the respective centers of the photo-detecting elements arranged in the optical receiving unit form a predetermined angle.

2. The light emitting/receiving composite unit as set forth in claim 1, further comprising:
a lens unit for causing the light emitted from the light source to go out from the composite unit and for converging or diverging the returning lights.

3. The light emitting/receiving composite unit as set forth in claim 1, wherein the polarizing unit is arranged between the optical splitting unit and the optical receiving unit.

4. The light emitting/receiving composite unit as set forth in claim 3, wherein the number of polarizing elements arranged in the polarizing unit is set to be equal to that of the photo-detecting elements, and polarization characteristics or polarizing angles of the respective polarizing elements are set to be different from each other.

5. A displacement detection apparatus, comprising:
a light emitting/receiving composite unit, which comprises
a light source for emitting a light,
an optical splitting unit for splitting returning lights into a plurality of lights, the light from the light source going to and returning from an external optical system to be the returning lights,
a polarizing unit for increasing and decreasing quantity of lights transmitted therefrom corresponding to polarization state of the returning lights,
an optical receiving unit which has a plurality of photo-detecting elements for detecting the lights transmitted through the polarizing unit,
wherein the light source, the optical splitting unit, the polarizing unit, and the optical receiving unit are unitedly integrated into one unit;
an objective unit having a diffraction grating;
a polarizing unit for changing polarization state of diffracted lights from the diffraction grating, the lights from the light emitting/receiving composite unit being diffracted by the diffraction grating to be the diffracted lights; and a reflecting unit for reflecting lights transmitted through the polarizing unit to cause the reflected lights go backward to the light emitting/receiving composite unit, wherein the light source of the light emitting/receiving composite unit has a light emitting element, and an optical path deflecting means for deflecting the light emitted from the light emitting element along a set up optical axis of the light source, and when viewing the light emitting/receiving composite unit from the direction of the optical axes of the light source and the optical receiving unit, a straight line including the light emission direction of the light emitting element and a straight line connecting the respective centers of the photo-detecting elements arranged in the optical receiving unit form a predetermined angle.

6. The displacement detection apparatus as set forth in claim 5, wherein the light emitting/receiving composite unit further comprises a lens unit for causing the light emitted from the light source to go out from the light emitting/receiving composite unit and for converging or diverging the returning lights.

7. The displacement detection apparatus as set forth in claim 5, wherein the polarizing unit is arranged between the optical splitting unit and the optical receiving unit of the light emitting/receiving composite unit.

8. The displacement detection apparatus as set forth in claim 7, wherein the number of polarizing elements arranged in the polarizing unit of the light emitting/receiving composite unit is set to be equal to that of the photo-detecting elements of the light emitting/receiving composite unit, and polarization characteristics or polarizing angles of the respective polarizing elements are set to be different from each other.

* * * * *

UNITED STATES PATENT AND TRADEMARK OFFICE
CERTIFICATE OF CORRECTION

PATENT NO. : 6,980,303 B2 Page 1 of 1
APPLICATION NO. : 10/240417
DATED : December 27, 2005
INVENTOR(S) : Hidehiro Kume et al.

It is certified that error appears in the above-identified patent and that said Letters Patent is hereby corrected as shown below:

Title Page: and Col. 1, Line 2
Item (54) should be read as follows:
 -- LIGHT-EMITTING/RECEIVING COMPOSITE UNIT AND
 DISPLACEMENT DETECTION APPARATUS USING THE SAME --.

Signed and Sealed this

Twentieth Day of February, 2007

JON W. DUDAS
*Director of the United States Patent and Trademark Office*